(12) United States Patent
Chern et al.

(10) Patent No.: US 10,913,630 B2
(45) Date of Patent: Feb. 9, 2021

(54) APPARATUS AND TAB-FORMING PROCESS FOR ADHESIVE BACKED PRODUCTS

(71) Applicant: The Tabbit, LLC, Buffalo Grove, IL (US)

(72) Inventors: Jerry Chern, Buffalo Grove, IL (US); Detlef Schmidt, Deer Park, IL (US)

(73) Assignees: Jerry Chem, Buffalo Grove, IL (US); Detlef Schmidt, Deer Park, IL (US)

( * ) Notice: Subject to any disclaimer, the term of this patent is extended or adjusted under 35 U.S.C. 154(b) by 0 days.

(21) Appl. No.: 16/529,363

(22) Filed: Aug. 1, 2019

(65) Prior Publication Data

US 2019/0352119 A1    Nov. 21, 2019

Related U.S. Application Data

(63) Continuation-in-part of application No. 15/143,186, filed on Apr. 29, 2016, which is a continuation-in-part of application No. 14/496,170, filed on Sep. 25, 2014, now Pat. No. 9,327,935.

(60) Provisional application No. 61/883,227, filed on Sep. 27, 2013, provisional application No. 62/713,311, filed on Aug. 1, 2018.

(51) Int. Cl.
*B65H 35/00* (2006.01)
*C09J 7/20* (2018.01)

(52) U.S. Cl.
CPC ....... *B65H 35/008* (2013.01); *B65H 35/0026* (2013.01); *C09J 7/20* (2018.01); *B65H 2301/45* (2013.01)

(58) Field of Classification Search
None
See application file for complete search history.

(56) References Cited

U.S. PATENT DOCUMENTS 4,634,415 A * 1/1987 Knoop ............... B65H 35/0026
267/164

FOREIGN PATENT DOCUMENTS

JP         09188468 A  *  7/1997  ......... B65H 35/0026

* cited by examiner

*Primary Examiner* — Barbara J Musser
(74) *Attorney, Agent, or Firm* — Scherrer Patent & Trademark Law, P.C.; Stephen T. Scherrer; Monique A Morneault

(57) ABSTRACT

The present invention relates to apparatuses and processes for forming tabs on adhesive backed products. Specifically, the apparatus of the present invention provides a sequential series of mechanisms to form a tab on an adhesive-backed product, such as adhesive tape, so that the same may be easy to remove from an article at a later date. More specifically, the apparatus of the present invention provides a sequential series of mechanisms to form a tab that is formed solely of the adhesive-backed product itself, which may be utilized for the subsequent removal thereof after placement on an article.

18 Claims, 6 Drawing Sheets

APPARATUS AND TAB-FORMING PROCESS FOR ADHESIVE BACKED PRODUCTS

The present invention claims priority to U.S. Provisional Pat. App. No. 62/713,311, titled "Apparatus and Tab-Forming Process for Adhesive Backed Products," filed Aug. 1, 2018, and further claims priority as a continuation-in-part of U.S. patent application Ser. No. 15/143,186, titled Apparatus and Tab-Forming Process for Adhesive Backed Products", filed Apr. 29, 2016, which claims priority as a continuation-in-part of U.S. patent application Ser. No. 14/496,170 titled, "Apparatus and Tab Forming Process for Adhesive Backed Products", filed Sep. 25, 2014, which claims priority to U.S. Provisional Patent App. No. 61/883,227, titled "Apparatus and Tab-Forming Process for Adhesive Backed Products," filed Sep. 27, 2013, each of which is expressly incorporated herein in its entirety.

TECHNICAL FIELD

The present invention relates to an apparatus and process for forming tabs on adhesive-backed products. Specifically, the apparatus of the present invention provides a sequential series of mechanisms to form a tab on an edge of an adhesive-backed product, such as adhesive tape, so that the same may be easy to remove from an article at a later date. More specifically, the apparatus of the present invention provides a corner tab on an adhesive backed product, such as adhesive tape.

BACKGROUND

Adhesive tape has been used for hundreds of years to bind articles together. Indeed, at the consumer level, in commerce, medicine, in industry, and in many other fields, tapes, labels and other adhesive-backed products are used daily. In many cases, the adhesive-backed product may be placed on an article to be removed at a future date. The difficulty in such removal is widely recognized, often requiring the use of a fingernail or other means to detach an edge of the substrate. Lost time, resulting in damage and frustration are the overwhelming result. Medical tape is a prime example, requiring placement of the tape on a patient's skin, on bandages, or on medical articles for use with a patient. However, the medical tape is typically removed when the bandage or medical article is removed. Removal thereof is often difficult, and typically requires an edge to be removed first, which may be difficult and result in frustration for the medical staff and discomfort for the patient.

While a tab at one margin of the adhesive-backed product would provide for easy future removal thereof, attempts to address this problem have not yet been fully successful. Approaches have included, among others, liquids applied to selectively neutralize the adhesive, mechanical folding devices that hazard getting stuck in the adhesive, and separate rolls of paper tabs to be applied to the product to form a non-sticking segment on the adhesive-backed product. A need, therefore, exists for an apparatus to create a tab on an adhesive-backed product that may be utilized for the removal thereof after placement on an article.

Moreover, a need exists for an apparatus and tab-forming process for adhesive-backed products that is simple and effective. Specifically, a need exists for an apparatus and tab-forming process for adhesive-backed products that consistently creates a tab on adhesive-backed products for easily grasping the same and removing the adhesive-backed products from articles adhered thereto. In addition, a need exists for an apparatus and tab-forming process for adhesive-backed products that forms a tab without adding material to the adhesive-backed products.

Further, a need exists for an apparatus and tab-forming process for adhesive-backed products that may be utilized with a plurality of types of adhesive-backed products, such as tapes, films, labels, and/or other like adhesive-backed products. Still further, a need exists for an apparatus and tab-forming process for adhesive-backed products that is easy to adjust for use with the plurality of types of adhesive-backed products.

In addition, a need exists for an apparatus and tab-forming process for adhesive-backed products having a tab-forming cycle that quickly forms a non-adhesive tab without binding the adhesive-backed product in the apparatus, and does not itself adhere to the adhesive disposed on the adhesive-backed products. Moreover, a need exists for an apparatus and tab-forming process for adhesive-backed products that may form a non-adhesive tab and allow a user to designate and choose a specific length of the adhesive-backed product for use thereof. Further, a need exists for an apparatus that can form a non-adhesive tab on adhesive-backed products, but also allows the user to choose to withdraw any length of tape with no tab at all.

Moreover, some applications do not allow an entire edge of an adhesive-backed product to be folded over onto itself with a hand-held device. In addition, providing a tab as an entire edge of an adhesive-backed product may project above a surface of an object to which the adhesive-backed product is adhered, which may not be desirable. A need, therefore, exists for an apparatus and tab-forming process for adhesive-backed products providing an angled tab in a corner of the adhesive-backed product. More specifically, a need exists for an apparatus and tab-forming process that provides a tab that is relatively easy to impose upon an adhesive-backed product, and is inconspicuous and lays flat against an object to which it is adhered.

SUMMARY OF THE INVENTION

The present invention relates to an apparatus and process for forming tabs on adhesive-backed products. Specifically, the apparatus of the present invention provides a sequential series of mechanisms to form a tab on an edge of an adhesive-backed product, such as adhesive tape, so that the same may be easy to remove from an article at a later date. More specifically, the apparatus of the present invention provides a corner tab on an adhesive backed product, such as adhesive tape.

To this end, in an embodiment of the present invention, an apparatus is provided for forming a corner tab on an adhesive-backed product, such as a length of tape, film, label, or other like adhesive-backed product.

In an embodiment, an apparatus for forming a tab on an adhesive-backed strip is provided. The apparatus comprises a base assembly and an upper arm assembly comprising a moving tab-forming element, the base housing having a first guide for positioning an adhesive-backed strip in proximity to the moving tab-forming element, wherein movement of the upper arm assembly towards the base housing causes the tab-forming element to move, wherein movement of the tab-forming element causes a corner of an end of the adhesive-backed strip to seal upon itself to form a tab on the adhesive-backed strip.

In an embodiment, the base assembly comprises a cutter comprising a stationary cutting blade and a pivoting cutting blade, such that the pivoting cutting blade moves forwardly prior to forming the tab on the adhesive-backed strip.

In an embodiment, the base assembly comprises a stationary tape support surface adjacent the stationary cutting blade and a pivoting tape support surface adjacent the pivoting cutting blade, wherein when the pivoting cutting blade moves forwardly, the pivoting tape support surface moves forwardly with it.

In an embodiment, the upper assembly comprises a top folding arm and a bottom folding arm, wherein the top folding arm and bottom folding arm are rotatably connected to the base assembly via an axle.

In an embodiment, the top folding arm is separated from the bottom folding arm via a spring.

In an embodiment, the top folding arm is limited from separating via a limiter.

In an embodiment, the top folding arm comprises a folding gear segment comprising at least one tooth, and the bottom folding arm comprises a folding gear, wherein the at least one tooth is engaged to the folding gear.

In an embodiment, the folding gear is disposed at an angle relative to the length of the adhesive-backed strip.

In an embodiment, the angle is about 45 degrees.

In an embodiment, the bottom folding arm further comprises a folding lever rotatably attached to the folding gear, such that rotation of the folding gear causes the folding lever to fold backwardly.

In an embodiment, the folding lever is connected to the folding gear via an axle.

In an embodiment, the folding gear segment is disposed at the angle relative to the length of the adhesive-backed strip.

In an embodiment, a system is provided. The system comprises: the apparatus; and a roll of adhesive-backed strip disposed on the apparatus.

In an embodiment, the adhesive-backed strip is a roll of tape.

In an alternate embodiment of the present invention, a method of disposing a corner tab in an edge of an adhesive-backed strip is provided. The method comprises the steps of: providing the apparatus; disposing a roll of adhesive-backed strip on the apparatus and pulling an edge of the adhesive-backed strip to a cutting element on the apparatus; tearing an end of the adhesive-backed strip from the roll of the adhesive-backed strip to form a new edge; and moving the upper assembly toward the base assembly causing the tab-forming element to form a corner tab in the new edge of the adhesive-backed strip.

In an embodiment, the cutting element comprises a stationary cutting blade and a pivoting cutting blade, the method further comprising the step of: moving the pivoting cutting blade away from the stationary cutting blade when the upper assembly is moved toward the base assembly.

In an embodiment, the upper assembly comprises a top folding arm and a bottom folding arm, wherein the top folding arm comprises a folding segment comprising at least one tooth, and the bottom folding arm comprises a folding gear rotatably attached to a folding lever, wherein the at least one tooth of the folding gear segment is engaged to the folding gear, further comprising the step of: moving the top folding arm toward the bottom folding arm after the upper assembly is moved toward the base assembly, thereby moving the folding gear segment downwardly relative to the folding gear thereby rotating the folding gear and the folding lever, wherein the folding lever folds a corner of the edge of the adhesive-backed strip down and back to seal the corner of the adhesive-backed strip to itself.

It is, therefore, an advantage and objective of the present invention to provide an apparatus to create a tab on an adhesive-backed product that may be utilized for the removal thereof after placement on an article.

Moreover, it is an advantage and objective of the present invention to provide an apparatus and tab-forming process for adhesive-backed products that is simple and effective.

Specifically, it is an advantage and objective of the present invention to provide an apparatus and tab-forming process for adhesive-backed products that consistently creates a tab on adhesive-backed products for easily grasping the same and removing the adhesive-backed products from articles adhered thereto.

In addition, it is an advantage and objective of the present invention to provide an apparatus and tab-forming process for adhesive-backed products that forms the tab without adding material to the adhesive-backed products. Specifically, it is an advantage and objective of the present invention to provide an apparatus and tab-forming process for adhesive-backed products that creates a tab on the adhesive-backed products that is formed solely of the adhesive-backed product itself.

Further, it is an advantage and objective of the present invention to provide an apparatus and tab-forming process for adhesive-backed products that may be utilized with a plurality of types and sizes of adhesive-backed products, such as tapes, films, labels, and/or other like adhesive-backed products.

Still further, it is an advantage and objective of the present invention to provide an apparatus and tab-forming process for adhesive-backed products, the design of which is easy to adjust for use with a plurality of types of adhesive-backed products.

In addition, it is an advantage and objective of the present invention to provide an apparatus and tab-forming process for adhesive-backed products having a tab-forming cycle that quickly forms a non-adhesive tab without allowing the binding of the adhesive to the apparatus in a way that would impede or prevent its proper function.

Moreover, it is an advantage and objective of the present invention to provide an apparatus and tab-forming process for adhesive-backed products that may form a non-adhesive tab and allow a user to designate and choose a specific length of the adhesive-backed product for use thereof.

In addition, it is an advantage and objective of the present invention to provide an apparatus and tab-forming process for forming an angled tab in a corner of an adhesive-backed product, such as adhesive tape.

Specifically, it is an advantage and objective of the present invention to provide an apparatus and tab-forming process that provides a tab that is relatively easy to impose upon an adhesive-backed product, and is inconspicuous and lays flat against an object to which it is adhered.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an apparatus and process for forming tabs on adhesive-backed products. Specifically, the apparatus of the present invention provides a sequential series of mechanisms to form a tab on an edge of an adhesive-backed product, such as adhesive tape, so that the same may be easy to remove from an article at a later date. More specifically, the apparatus of the present invention provides a corner tab on an adhesive backed product, such as adhesive tape.

The adhesive-backed product may be, but is not limited to, tapes, films and labels. The principles and functionality of the present invention are demonstrated in the preferred embodiments, provided herein in FIGS. 1-6.

Figure 1:
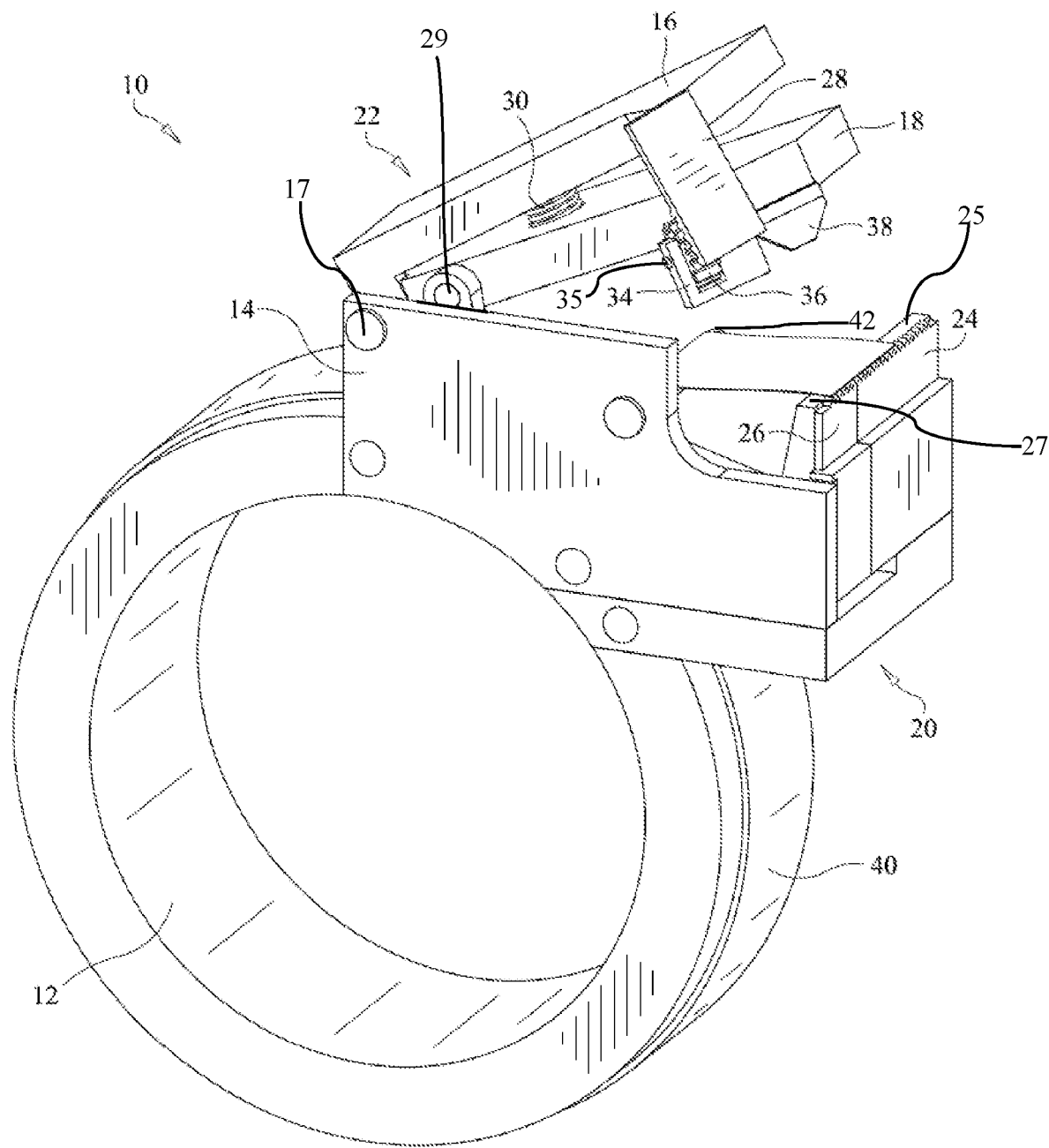
FIG. 1 illustrates a front raised perspective view of a tab-forming apparatus for adhesive-backed products in an embodiment of the present invention.
Figure 2:
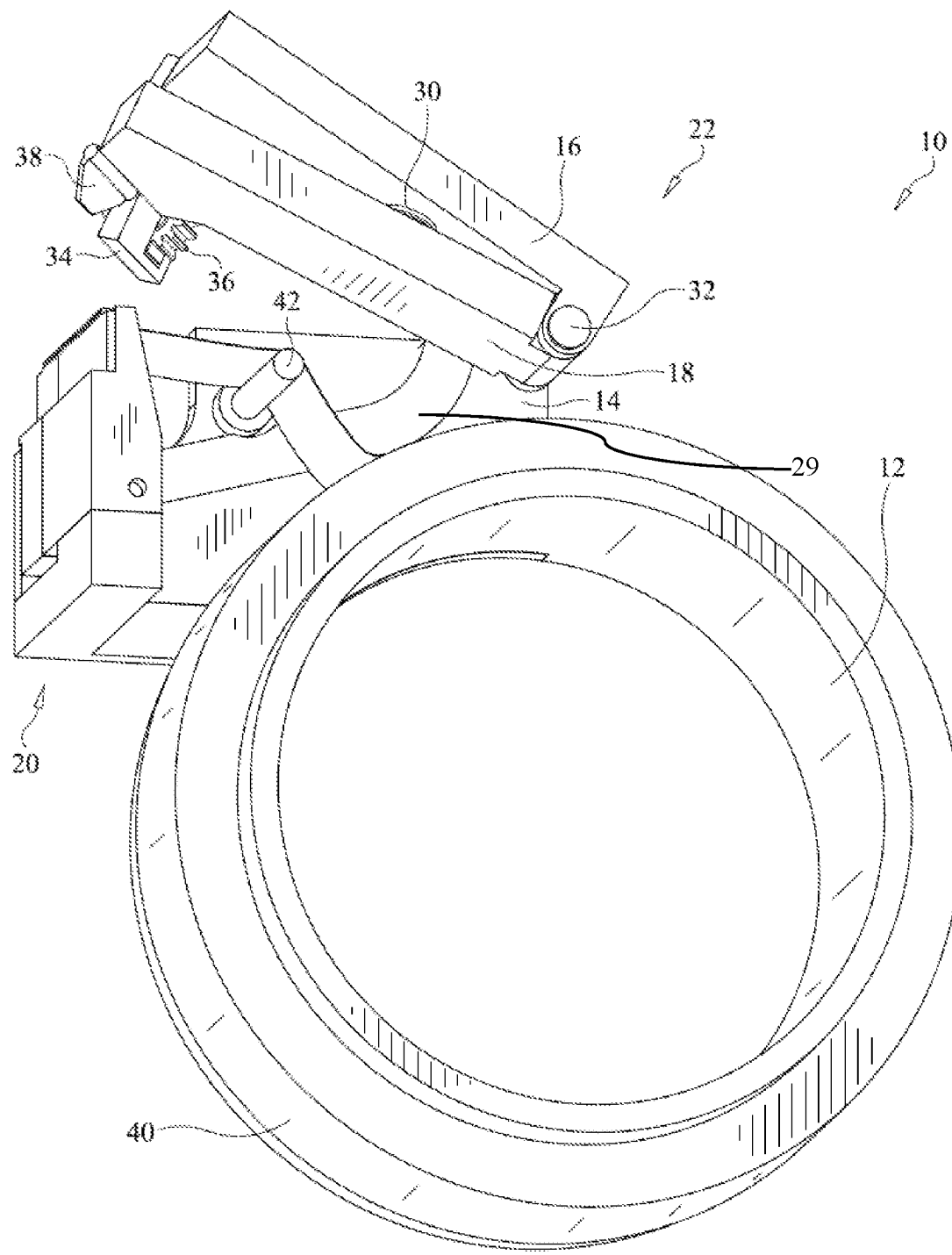
FIG. 2 illustrates a rear perspective view of a tab-forming apparatus for adhesive-backed products in an embodiment of the present invention.

A tab forming and cutting apparatus 10 of the present invention is illustrated in FIG. 1 and comprises a tape holder drum or hub 12, a side bracket 14 that holds a folding mechanism comprising a base assembly 20 and an upper assembly 22 that are rotatably pinned together via a rotatable axis or hinge 17. The upper assembly comprises a top folding arm 16 and a bottom folding arm 18 that are rotatably pinned together via axis or hinge 17.

Figure 3:
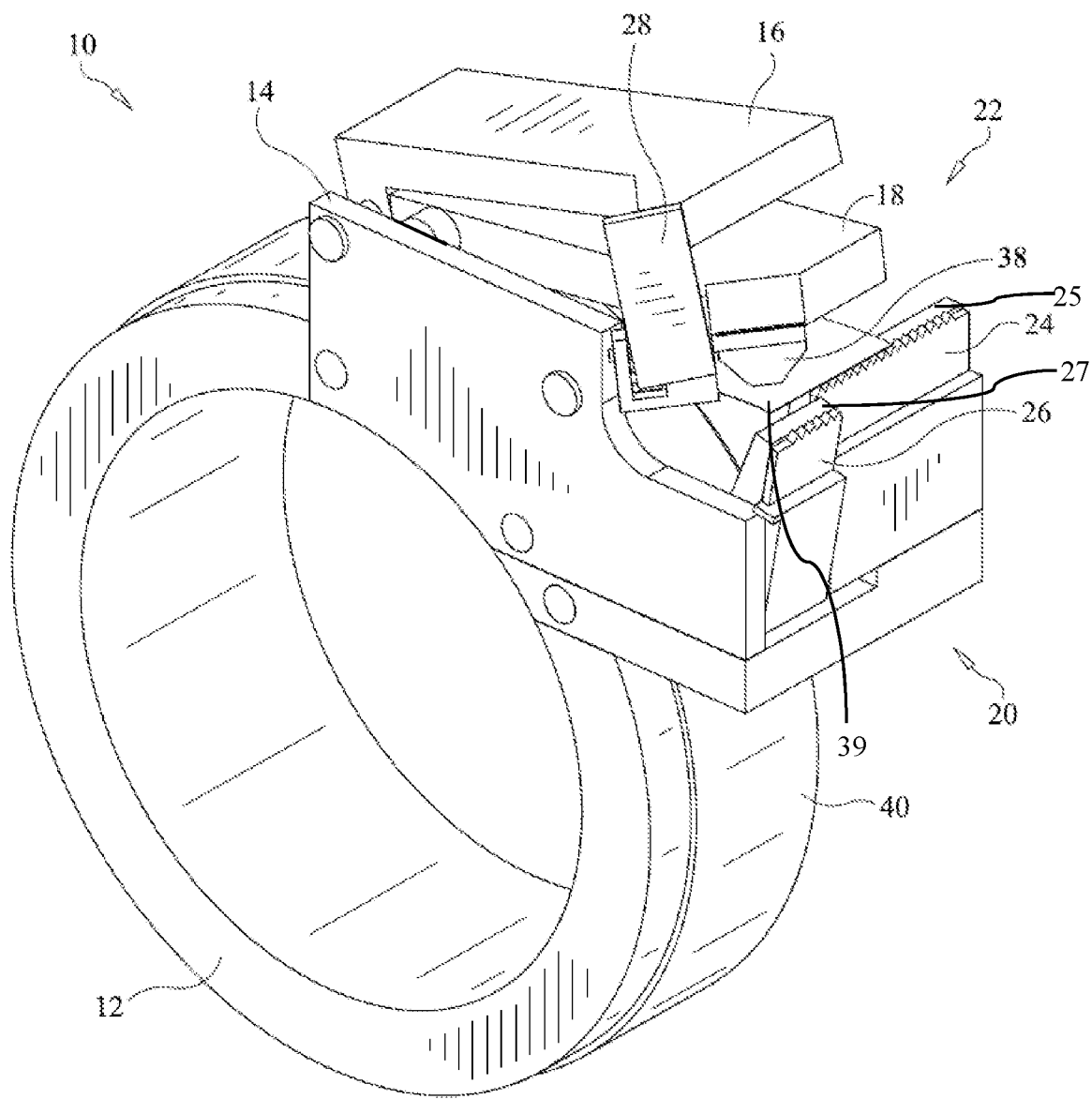
FIG. 3 illustrates a front perspective view of a tab-forming apparatus with a movable section of a cutter apparatus in a moved position in an embodiment of the present invention.

On the base assembly 20 may be a cutter comprising a stationary cutting blade 24 and a pivoting cutting blade 26, generally disposed side-by-side. Adjacent stationary cutting blade 24 may be stationary tape support 25, and adjacent pivoting cutting blade 26 may be pivoting tape support 27. A pivoting cutting blade linkage 29 may be rotatably attached to the bottom folding arm 18 on one end thereof and to pivoting cutting blade 26 on an opposite end thereof, such that pivoting cutting blade 26 may separate from stationary cutting blade 24 and pivot the same forwardly, as illustrated in FIG. 3

An adhesive backed product, such as a tape 40 may be disposed on the tape holder drum 12, and a terminal end thereof may be pulled over tape roller 42 and then onto stationary tape support 25 and pivoting tape support 27, disposed side-by-side, as illustrated in FIG. 1. Stationary cutting blade 24 and pivoting cutting blade 26 may be used to tear the tape 40, as desired.

The top folding arm 16 is rotatably pinned to the bottom folding arm 18 on ends thereof via axis 17, attached to the side bracket 14. The top folding arm 16 is separated from the bottom folding arm 18 via arm return spring 30.

Extending from the top folding arm 16 may be a folding gear segment 28 that is set at an angle on a side of the top folding arm 16. Preferably, the folding gear segment 28 may be set at a 45 degree angle relative to the length of the tape 40, however, it should be noted that the folding gear segment may be set at any angle apparent to one of ordinary skill in the art. The bottom folding arm 18 may have a folding gear 36, rotatably disposed on a holding bracket 34 via axis 35. Axis 35 may extend to folding lever 38 that may be rotatable via the axis 35, which may be rotated by folding gear 36. The folding gear segment 28 may have one or more teeth thereon engaged to teeth on the folding gear 36. As the top folding arm 16 is pushed downwardly against bottom folding arm 18, the folding gear segment 28 may descend relative to the folding gear 36 thereby rotating the folding gear 36, which, in turn, may rotate the folding lever 38. Folding lever 38, also set at an angle relative to the length of the tape 40, may thus rotate inwardly toward the tape 40. Folding lever 38 may preferably be set at a 45 degree angle relative to the length of the adhesive-backed material, although any angle is contemplated by the present invention. The angle of the folding lever 38 may dictate the angle of the corner tab formed by the tab-forming mechanism, as described below.

As illustrated in FIG. 3, pivoting cutting blade 26 and pivoting tape support 27 is separated away from the length of tape 40, thereby clearing these elements from the folding mechanism as the same descends from the upper assembly 22. The pivoting tape support 27 may separate from the adhesive of the tape 40 due to the larger contact surface of the stationary tape support 25 relative to the contact surface of the pivoting tape support 27. At this point, the edge of the tape 40 has a portion that is adhered to the stationary tape support 25 and a portion (corner 39) that is not adhered to any support surface, as illustrated in FIG. 3

Figure 4:
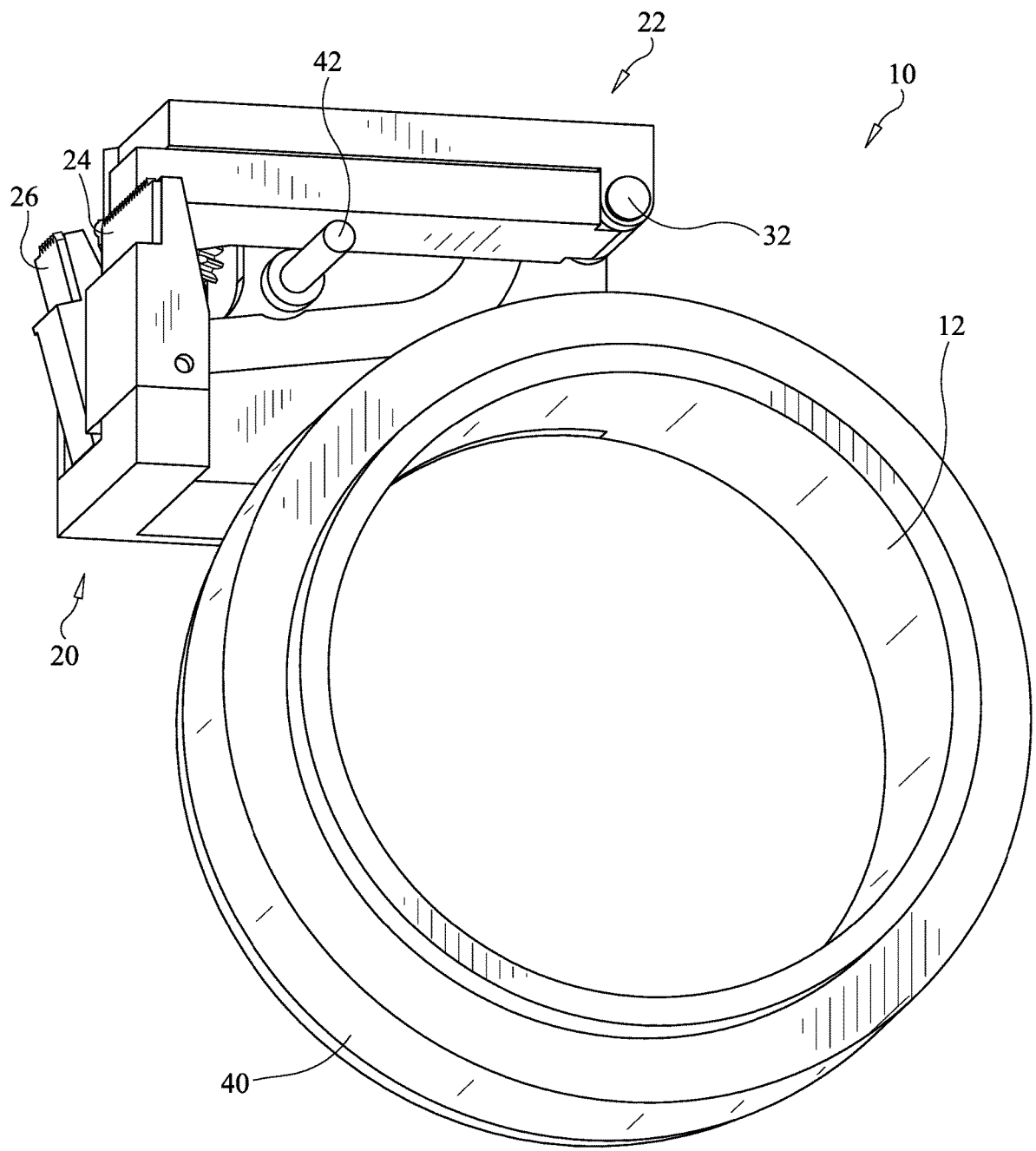
FIG. 4 illustrates a rear perspective view of a tab-forming apparatus with a movable tab-forming element engaged to form tab in a corner of an adhesive-backed product, specifically an adhesive tape in an embodiment of the present invention.
Figure 5:
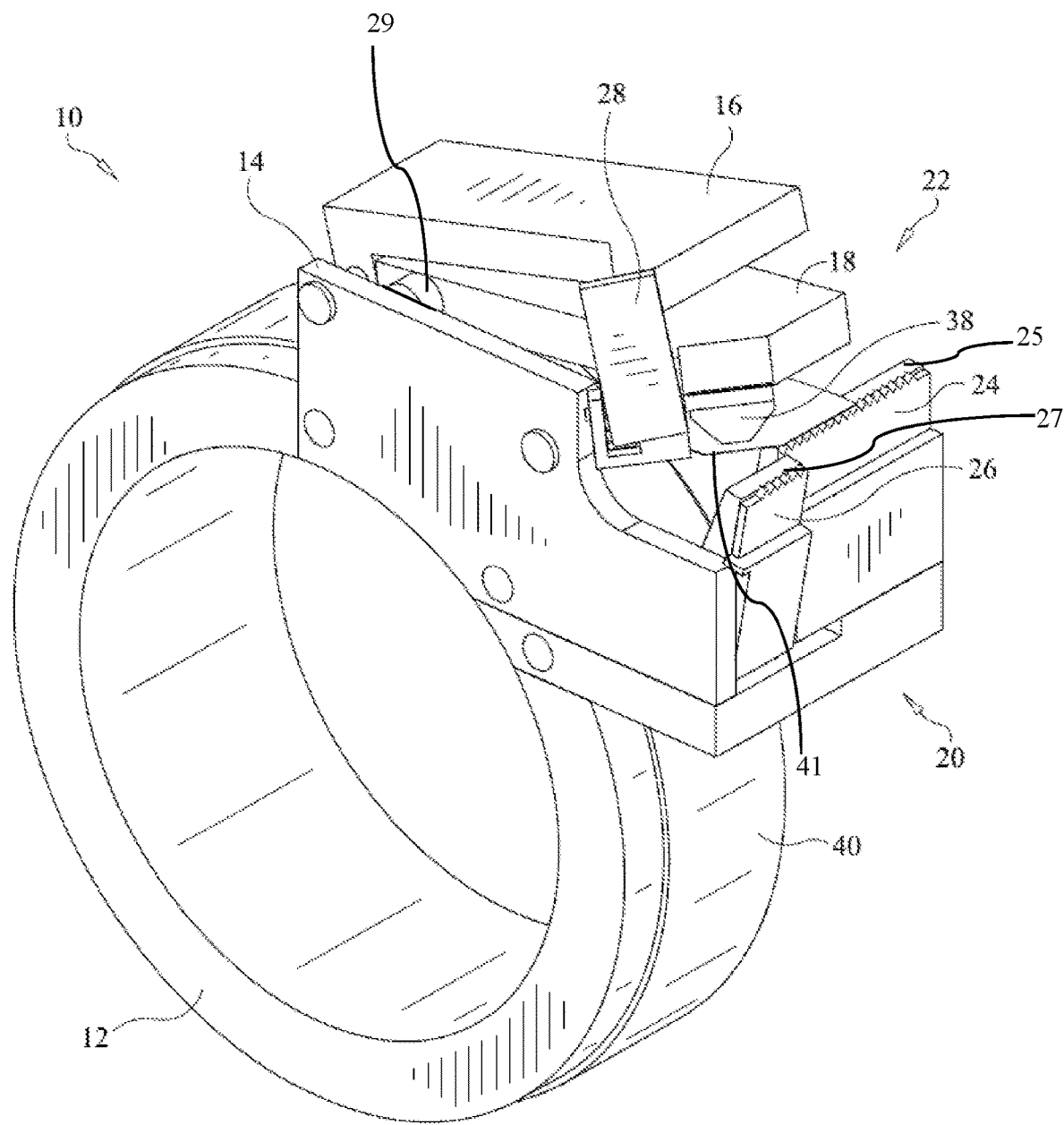
FIG. 5 illustrates a front perspective view of a tab-forming apparatus and an adhesive-backed product having a tab formed in a corner thereof in an embodiment of the present invention.

After the pivoting cutting blade 26 and pivoting tape support 27 are cleared, the continuous push of the top folding arm 16 against the bottom folding arm 18, as illustrated in FIG. 4, may cause the folding gear segment 28 to descend relative to the folding gear 36, as described above, causing the folding lever 38 to rotate. The folding lever 38, at this point, may be positioned adjacent the corner 39 of the tape 40. As the folding lever 38 rotates, it may push the corner 39 down and back so that the corner 39 seals upon the remainder of the tape 40, thereby forming a corner tab 41, as illustrated in FIG. 5. Generally, the angle between the top and bottom folding arms 16, 18 is such that, when closed, it allows roughly a 90 degree rotation of the folding lever 38 as it captures and folds the corner 39 of the tape 40 onto itself creating the corner tab 41. In addition, when the folding lever 38 is rotated fully, there may be a gap between the folding lever 38 and the underside of the lower folding arm 18 to account for two thicknesses of tape 40 (after folding), as needed.

Release of the upper assembly causes the upper assembly to ascend and the pivoting cutting blade 26 and the pivoting tape support 27 move back into their initial positions adjacent the stationary cutting blade 24 and the stationary tape support 25, respectively. Thus, the tape 40, having corner tab 41 disposed therein, may be grasped by a user and pulled to expose a length of tape that may be cut using stationary and pivoting cutting blades 24, 26.

Figure 6:
FIG. 6 illustrates a perspective view of a user using a tab-forming apparatus for adhesive-backed products in an embodiment of the present invention.

As shown in FIG. 6, a user may use the apparatus 10 of the present invention to pull a length of tape therefrom having a corner tab disposed therein. For example, the present invention may be particularly useful for painters that utilized painter's tape for edging during painting, as the tape length having the corner tab therein may be easily removed from a wall or other like object.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An apparatus for forming a tab on an adhesive-backed strip comprising:
   a base assembly and an upper arm assembly comprising a moving tab-forming element, the base housing having a first guide for positioning an adhesive-backed strip in proximity to the moving tab-forming element, wherein movement of the upper arm assembly towards the base housing causes the tab-forming element to move, wherein movement of the tab-forming element causes only a corner of an end of the adhesive-backed strip to seal upon itself to form a tab on the adhesive-backed strip.

2. The apparatus of claim 1 wherein the base assembly comprises a cutter comprising a stationary cutting blade and a pivoting cutting blade, such that the pivoting cutting blade moves forwardly prior to forming a tab on the adhesive-backed strip.

3. The apparatus of claim 2 wherein the base assembly comprises a stationary tape support surface adjacent the stationary cutting blade and a pivoting tape support surface adjacent the pivoting cutting blade, wherein when the pivoting cutting blade moves forwardly, the pivoting tape support surface moves forwardly with it.

4. The apparatus of claim 1 wherein the upper assembly comprises a top folding arm and a bottom folding arm, wherein the top folding arm and bottom folding arm are rotatably connected to the base assembly via an axle.

5. The apparatus of claim 4 wherein the top folding arm is separated from the bottom folding arm via a spring.

6. The apparatus of claim 4 wherein the top folding arm is limited from separating via a limiter.

7. The apparatus of claim 4 wherein the top folding arm comprises a folding gear segment comprising at least one tooth, and the bottom folding arm comprises a folding gear, wherein the at least one tooth is engaged to the folding gear.

8. The apparatus of claim 7 wherein the folding gear is disposed at an angle relative to the length of the adhesive-backed strip.

9. The apparatus of claim 8 wherein the angle is about 45 degrees.

10. The apparatus of claim 8 wherein the folding gear segment is disposed at the angle relative to the length of the adhesive-backed strip.

11. The apparatus of claim 7 wherein the bottom folding arm further comprises a folding lever rotatably attached to the folding gear, such that rotation of the folding gear causes the folding lever to fold backwardly.

12. The apparatus of claim 11 wherein the folding lever is connected to the folding gear via an axle.

13. The apparatus of claim 1 comprising:
   an adhesive-backed strip holder drum for holding a roll of adhesive-backed strip.

14. A system comprising:
   the apparatus of claim 1; and
   a roll of adhesive-backed strip disposed on the apparatus.

15. The system of claim 14 wherein the adhesive-backed strip is a roll of tape.

16. A method of disposing a corner tab in an edge of an adhesive-backed strip comprising the steps of:
   providing the apparatus of claim 1;
   disposing a roll of adhesive-backed strip on the apparatus of claim 1 and pulling an edge of the adhesive-backed strip to a cutting element on the apparatus;
   tearing an end of the adhesive-backed strip from the roll of the adhesive-backed strip to form a new edge; and
   moving the upper assembly toward the base assembly causing the tab-forming element to form a corner tab in the new edge of the adhesive-backed strip.

17. The method of claim 16 wherein the cutting element comprises a stationary cutting blade and a pivoting cutting blade, further comprising the step of:
   moving the pivoting cutting blade away from the stationary cutting blade when the upper assembly is moved toward the base assembly.

18. The method of claim 16 wherein the upper assembly comprises a top folding arm and a bottom folding arm, wherein the top folding arm comprises a folding segment comprising at least one tooth, and the bottom folding arm comprises a folding gear rotatably attached to a folding lever, wherein the at least one tooth of the folding gear segment is engaged to the folding gear, further comprising the step of:
   moving the top folding arm toward the bottom folding arm after the upper assembly is moved toward the base assembly, thereby moving the folding gear segment downwardly relative to the folding gear thereby rotating the folding gear and the folding lever, wherein the folding lever folds a corner of the edge of the adhesive-backed strip down and back to seal the corner of the adhesive-backed strip to itself.

* * * * *